(12) United States Patent
Moon et al.

(10) Patent No.: US 7,814,440 B2
(45) Date of Patent: Oct. 12, 2010

(54) METHOD FOR CONTROLLING DISPLAY OF INDICATORS IN WIRELESS MOBILE TERMINAL

(75) Inventors: Byoung-Seoup Moon, Suwon-shi (KR); Sung-Chul Yang, Suwon-shi (KR)

(73) Assignee: Samsung Electronics Co., Ltd (KR)

( * ) Notice: Subject to any disclaimer, the term of this patent is extended or adjusted under 35 U.S.C. 154(b) by 979 days.

(21) Appl. No.: 10/427,858

(22) Filed: May 1, 2003

(65) Prior Publication Data

US 2004/0090469 A1 May 13, 2004

(30) Foreign Application Priority Data

Nov. 11, 2002  (KR) .................. 10-2002-0069634

(51) Int. Cl.
*G06F 3/00* (2006.01)
*G06F 9/00* (2006.01)
*G06F 17/00* (2006.01)

(52) U.S. Cl. ................ 715/864; 715/762; 715/763; 715/810

(58) Field of Classification Search .......... 455/566, 455/400, 415, 416, 413, 422.1; 715/810, 715/817, 818, 819, 820, 828, 829, 839, 841, 715/763, 762, 864

See application file for complete search history.

(56) References Cited

U.S. PATENT DOCUMENTS

| | | | |
|---|---|---|---|
| 6,047,197 A * | 4/2000 | Jarrad ...................... | 455/566 |
| 6,211,858 B1 | 4/2001 | Moon et al. ................. | 715/771 |
| 6,661,438 B1 | 12/2003 | Shiraishi et al. | |
| 2001/0055038 A1* | 12/2001 | Kim ........................... | 345/810 |
| 2002/0160817 A1 | 10/2002 | Salmimaa et al. ........... | 455/566 |

FOREIGN PATENT DOCUMENTS

| | | |
|---|---|---|
| CN | 1325597 A | 5/2001 |
| CN | 1329451 A | 1/2002 |
| EP | 1028570 | 8/2000 |
| EP | 1 154 619 | 11/2001 |
| EP | 1209882 A2 * | 5/2002 |
| JP | 2001-202178 | 7/2001 |
| KR | 2002-59556 | 7/2002 |

* cited by examiner

*Primary Examiner*—Tadesse Hailu
*Assistant Examiner*—Anita D Chaudhuri
(74) *Attorney, Agent, or Firm*—The Farrell Law Firm, LLP

(57) ABSTRACT

A method for allowing users to set a display of desired indicator icons indicating states of a wireless mobile terminal such as a battery status and a received signal strength. The method includes the steps of selecting an indicator setting menu, selecting an indicator icon desired by a user, selecting a display mode of the indicator icon, and then determining whether to apply or cancel the indicator icon's selection.

9 Claims, 5 Drawing Sheets

METHOD FOR CONTROLLING DISPLAY OF INDICATORS IN WIRELESS MOBILE TERMINAL

PRIORITY

This application claims priority to an application entitled "METHOD FOR CONTROLLING DISPLAY OF INDICATORS IN WIRELESS MOBILE TERMINAL", filed in the Korean Industrial Property Office on Nov. 11, 2002 and assigned Serial No. 2002-69634, the contents of which are hereby incorporated by reference.

BACKGROUND OF THE INVENTION

1. Field of the Invention

The present invention relates to a wireless mobile terminal, and more particularly to a method for controlling the display of indicator icons in a wireless mobile terminal, whereby a user can set the display of indicator icons indicating states of the terminal or mobile phone such as a battery status and a received signal strength

2. Description of the Related Art

Generally, a user with a wireless mobile terminal communicates information by means of voice communication or wireless Internet functions.

As wireless communication technologies have been developed, portable information terminals such as mobile phones or PDAs (Personal Digital Assistant) comprise a communication function. Such portable information terminals will also generally be referred to as "wireless mobile terminals", "mobile terminals" or the like. A display of the wireless mobile terminal has an indicator region (for example, at its upper portion) for displaying icons for indicating current states of the terminal such as a battery status, a received signal strength, call status, a roaming status, and alarm status.

As the number of functions increases, the number of status indicating icons required to be simultaneously displayed increases. However, a typical mobile terminal has a limited area of its display region, thereby restricting the number of displayable icons. Thus, in the case where there are many different kinds of indicators, it is necessary to omit part of the indicators in order of priority, or to reduce the sizes of the icons in order to increase the number of displayable icons. However, as the icon size decreases, it becomes difficult for the user to read the status of the icons and/or discriminate between icons.

Most information terminals of the prior art having a telephone communication function such as a mobile phone selectively display limited kinds of indicator icons due to the limited area of the indicator region of the display. In addition, when a new function is added, the conventional information terminal cannot display an indicator for the new function.

Further, some indicators such as a roaming indicator are hardly understood by general users. It would therefore be more desirable to allow users to replace such an indicator with a more useful indicator according to desires of each of the users. However, there is no mobile terminal allowing users to control the display of the indicators.

SUMMARY OF THE INVENTION

Therefore, the present invention has been made in view of the above problems, and it is an object of the present invention to provide a method for allowing users to set, according to desires of each user, indicator icons to be displayed on an icon display portion of a wireless mobile terminal for indicating current states of the terminal, wherein each user can select indicator icons useful to each user at an indicator icon setting menu of the terminal.

It is another object of the present invention to provide a method for allowing users to set and control the display of indicator icons in a wireless mobile terminal, wherein the users can select one of two indicator display modes: one mode is a fixed display mode in which the indicator icons are all displayed on a single display screen so that the users can see all the indicator icons simultaneously, and the other is a sliding display mode in which the users can see desired indicator icons set by themselves while scrolling up, down, right, and/or left through more than one screen.

In accordance with on aspect of the present invention, the above and other objects can be accomplished by the provision of a method for controlling a display of indicators in a wireless mobile terminal, comprising the steps of:

selecting an indicator setting menu;

selecting an indicator icon desired by a user;

determining whether to apply or cancel selection of the indicator icon; and selecting a display mode of the indicator icon.

Preferably, the step of selecting the display mode comprises selection of one of a fixed screen mode, in which a predetermined number of indicator icons are displayed through one screen, and a sliding screen mode in which indicator icons set to be displayed are all displayed while scrolling up, down, left, and/or right through more than one screen.

In accordance with another aspect of the present invention, there is provided a method for operating a display of indicators in a wireless mobile terminal, comprising the steps of:

allowing a wireless mobile terminal to receive a call signal;

allowing an indicator processing manager to receive an operating signal for an indicator icon corresponding to the call signal;

allowing the indicator processing manager to check whether there is an indicator icon set to be activated according to the call signal;

checking a display mode of indicator icons; and notifying a user of the indicator icon by displaying the indicator icon on an indicator display region of the wireless mobile terminal.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE PREFERRED EMBODIMENTS

Now, preferred embodiments of the present invention will be described in detail with reference to the annexed drawings.

The present invention allows users to set and control indicator icons to be displayed at corresponding positions. In the case where the user does not want to display a status indicator such as a roaming indicator, or wants to selectively display indicators useful to the user, the present invention allows the user to set indicator icons according to the user's desires.

Figure 1:
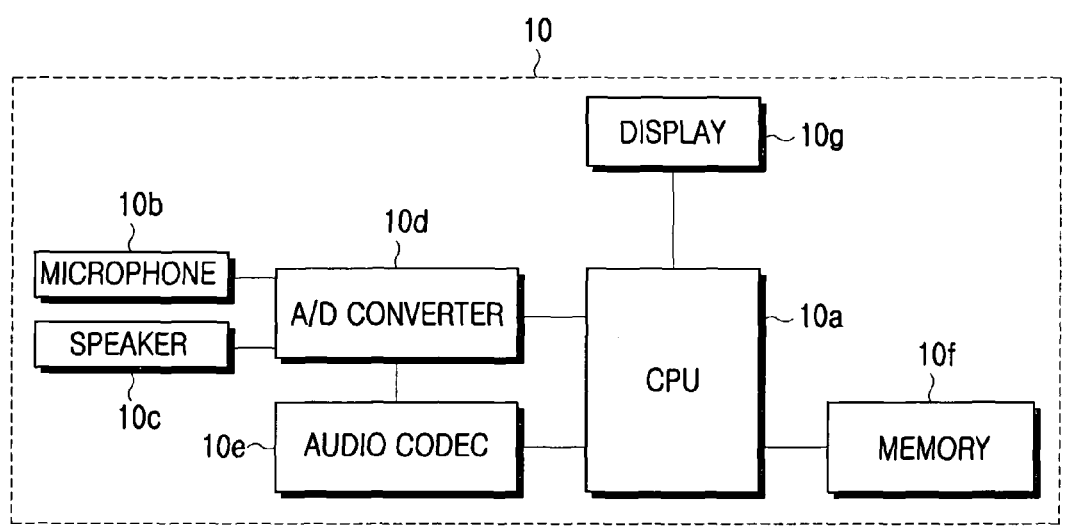
FIG. 1 is a schematic view showing the configuration of a wireless mobile terminal.

FIG. 1 is a schematic view showing the configuration of a wireless mobile terminal 10. As shown in FIG. 1, the terminal 10 includes a CPU 10*a*, a microphone 10*b*, a speaker 10*c*, an A/D converter 10*d* for converting an analog signal to a digital signal, an audio codec 10*e*, a memory 10*f*, a display 10*g*, and a touch panel (not shown).

Figure 2:
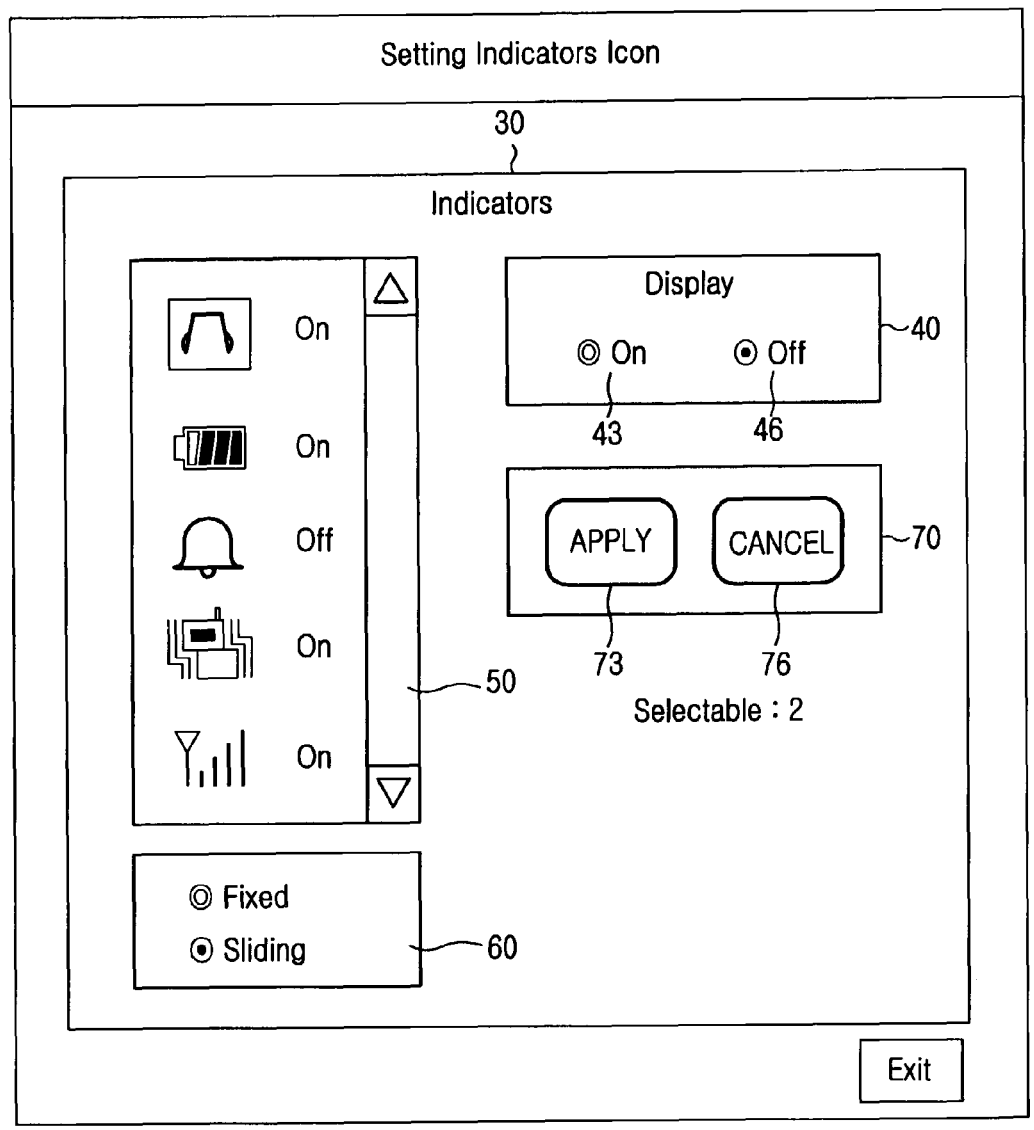
FIG. 2 is a view showing a screen for setting indicator icons according to the present invention.

FIG. 2 is a view showing an example of a screen presented on display 10*g* for setting indicator icons according to the present invention.

In response to a user's selection of an indicator setting menu, a indicator setting menu screen 30 is displayed as shown in FIG. 2. In FIG. 2, reference numeral 50 denotes an indicator list section, reference numeral 40 denotes a display on/off section, and reference numeral 60 denotes fixed and sliding mode selection portions.

For the plurality of indicator icons shown in the indicator list section 50, "On" or "Off" is displayed on the right of the icons to indicate whether the selected icon is currently displayed or not.

After selecting an indicator icon at the indicator list section 50 (for example, via a touch sensitive display), the user determines whether to enable the selected icon's display in an ON/OFF manner, i.e., in such a manner of operating the display on/off section 40, and the determined on or off states are displayed in the indicator list section 50. The user applies the selection regarding the icon via apply/cancel section 70.

The user can select a fixed screen mode, one of two indicator display modes, at the display mode selection portion 60 to display all indicator icons set to be displayed through one screen. In the fixed screen mode, the number of indicator icons the user can select is limited because all the indicator icons must be displayed through one screen. If the user selects the fixed screen mode at the display mode selection portion 60, the number of indicator icons the user can select is displayed at a selectable number display portion "Selectable". FIG. 2 shows that the selectable number of indicator icons is 2.

The user can select the other indicator display mode, a sliding screen mode, at the display mode selection portion 60 to display as many indicator icons as selected by the user while scrolling up, down, left, and/or right through more than one display screen. This sliding screen mode does not limit the number of indicator icons the user can select, in contrast to the fixed screen mode.

In the case where the user tries to convert the indicator display mode from the sliding screen mode to the fixed screen mode at the indicator setting menu screen, if the number of indictor icons is too large to be displayed through one screen, the conversion to the fixed screen mode is not allowed. In this case, the user must reduce the number of indicator icons set to be displayed for conversion to the fixed screen mode, or remain in the sliding screen mode.

Figure 3:
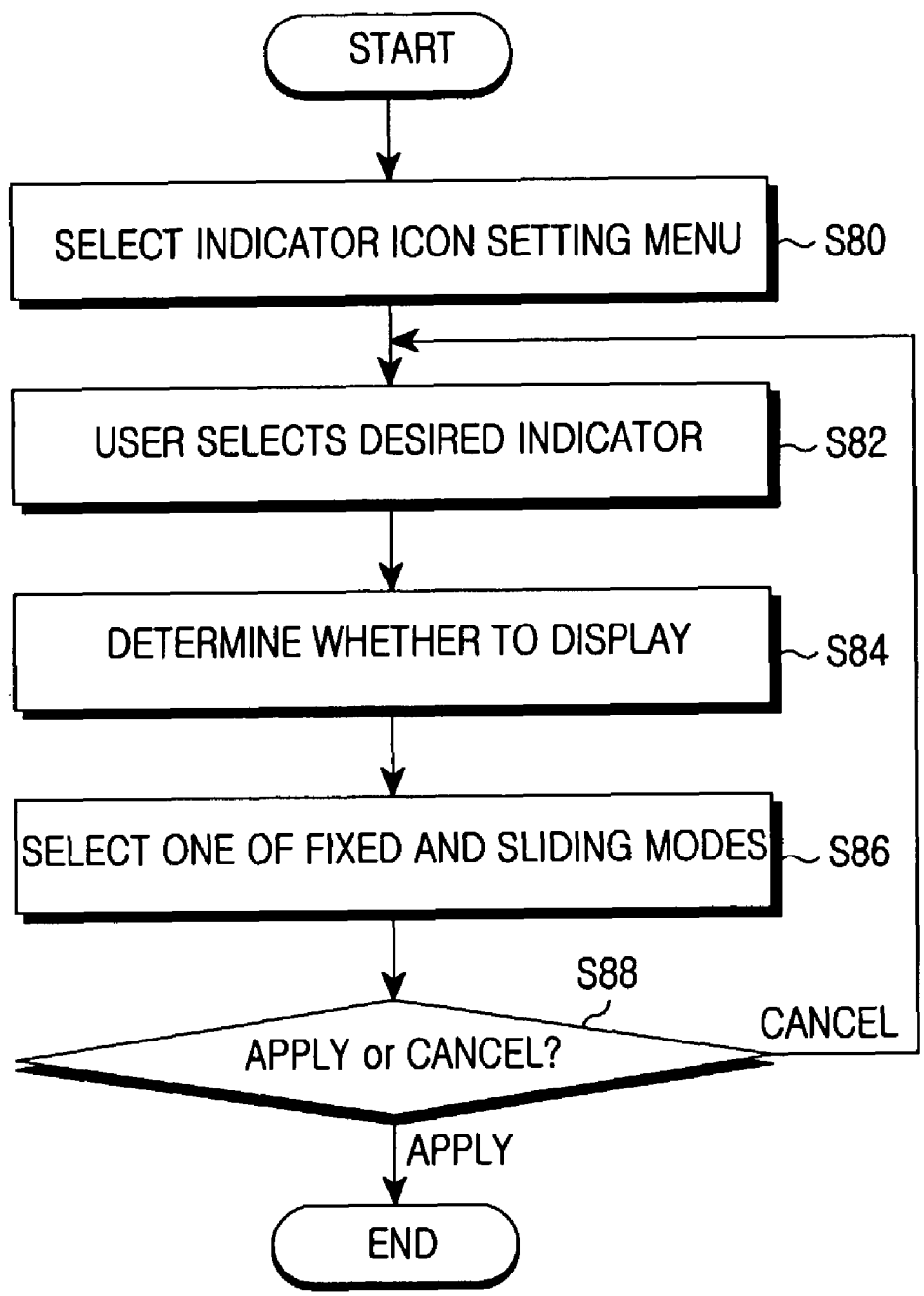
FIG. 3 is a view showing a flowchart illustrating the procedure of setting indicator icons according to the present invention.

FIG. 3 is a view showing a flowchart illustrating the procedure of setting indicator icons according to the present invention.

When a user selects a menu item for setting indicator icons from a menu of a wireless mobile terminal, a screen as shown in FIG. 2 is displayed in step S80.

The user selects desired indicator icons from a plurality of indicator icons in the indicator list section 50 in step S82, and determines whether to enable the selected icons' display in an ON/OFF manner, i.e., in a manner of operating the display on/off section 40 in step S84.

Essential indicator icons such as a battery status and received signal strength are set to be always displayed, irrespective of the user's selection. It is possible to set the sliding screen mode such that only the essential indicator icons are displayed without scrolling the screen and the other indicator icons are displayed by scrolling the screen.

Subsequently, in step S86, the user determines a desired mode of displaying the indicator icons which are set to be displayed by the user, i.e., the user selects one of the fixed and sliding screen modes at the display mode selection portion 60.

In the fixed screen mode, the number of indicator icons the user can select is limited because all the indicator icons must be displayed through one screen, and the selectable number of indicator icons is displayed as shown in FIG. 2. In the sliding screen mode, a number of indicator icons equal to the number selected by the user are displayed while scrolling up, down, left, and/or right through more than one display screen.

After the user selects desired indicator icons, the user determines whether to apply the selection (step S88) through an apply/cancel section 70 as shown in FIG. 2. In step S88, the user can restart the indicator icon setting procedure from step S82 by selecting a "Cancel" button at the apply/cancel section 70.

By selecting an "Apply" button in step S88, the user can apply the desired indicator setting so that the selected indicator icons are displayed on the screen of the wireless mobile terminal.

In such a manner, the present invention allows users to set indicator icons of a wireless mobile terminal according to each user's desires.

Figure 4:
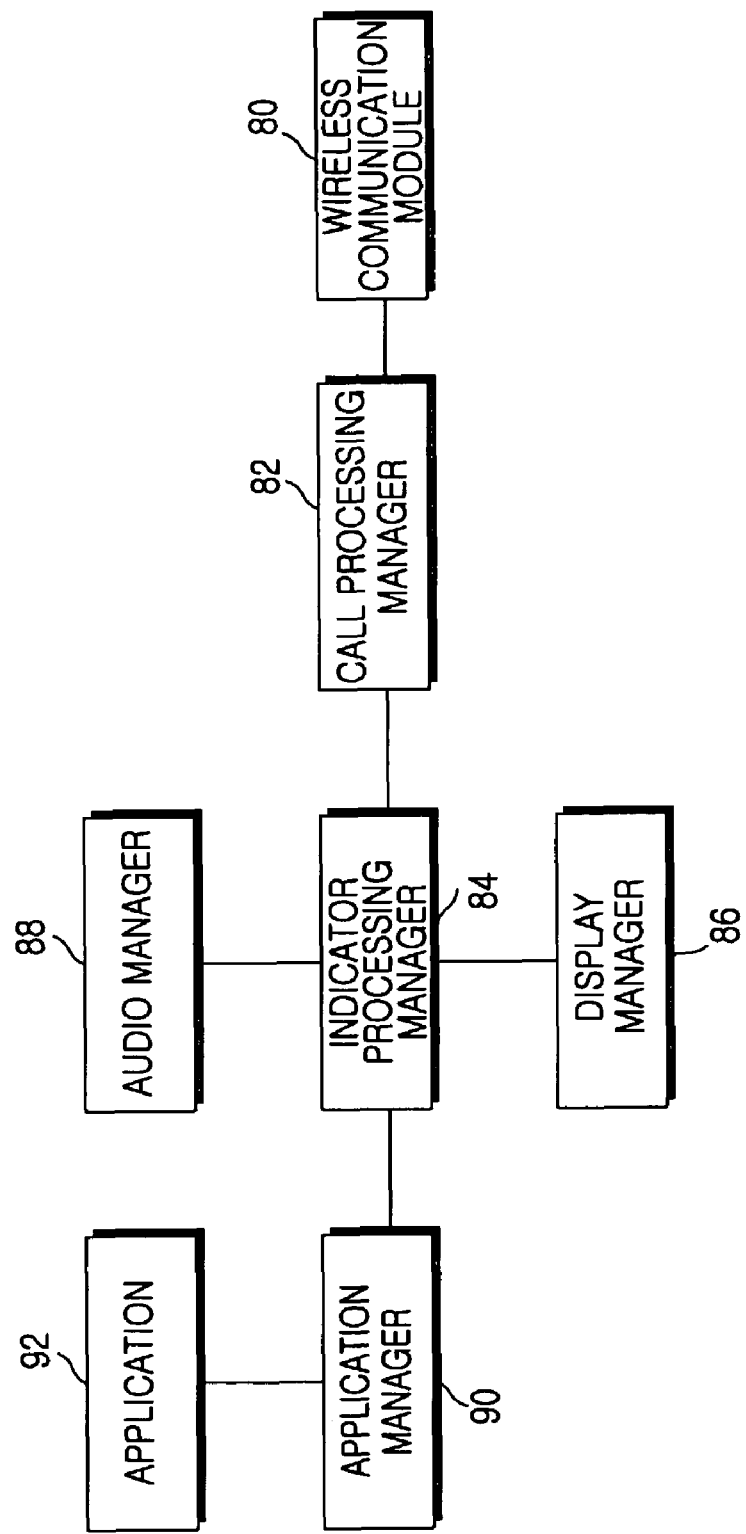
FIG. 4 is a view showing a processing module for controlling the operation of indicator icons according to the present invention.

FIG. 4 is a view showing a processing module for controlling the operation of indicator icons according to the present invention.

When a wireless (RF) communication module 80 for transmitting and receiving a wireless signal such as a call signal receives a call signal, a call processing manager 82 performs a process corresponding to the received call signal, such as a voice call or text message signal. An indicator processing manager 84 controls an operation related to the set indicator icons when an operation related to a voice call or a text message is activated.

A display manager 86 controls an operation of notifying the user of the terminal's status through the screen of the terminal. As the operation related to the voice call or the text message is activated, an audio manager 88 controls the operation of, e.g., a bell sound generator to notify the user of the activated operation.

An application manager 90 controls operations other than the voice call operation. An application section 92 operates application programs for various terminal-related services such as an Internet or text message service.

According to the present invention, after the user has set indicators according to the user's desires, the indicator processing manager 84 controls the operations related to the selected indicator icons in the fixed or sliding mode by displaying the icons continuously (or by having them accessible by scrolling in the sliding mode) and/or by invoking an applicable display icon when the terminal's operation related to the voice call, Internet service, a game, a text message, or the like is activated.

Figure 5:
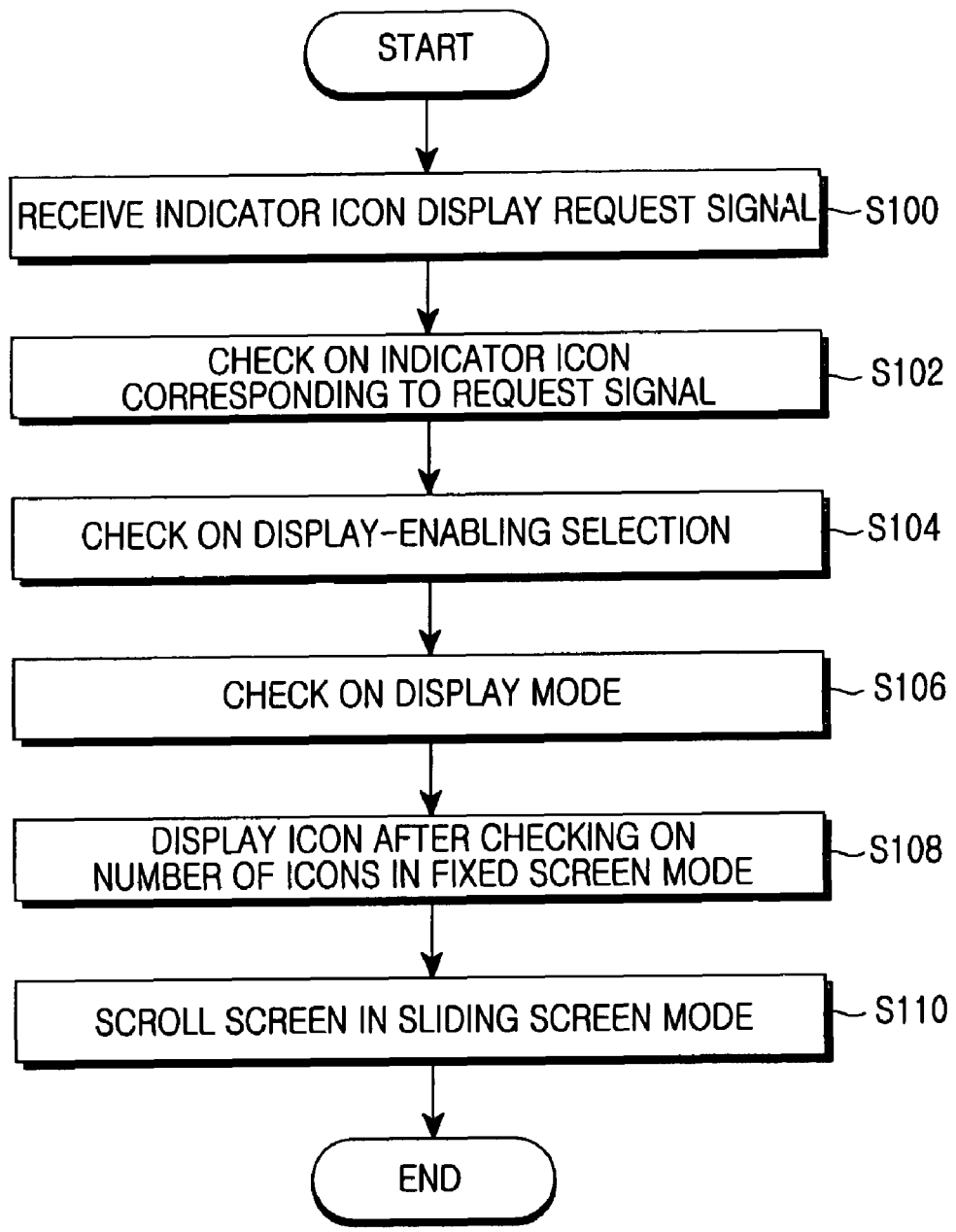
FIG. 5 is a view showing the operating procedure of the wireless mobile terminal after the user sets indicator icons.

FIG. 5 is a view showing the operating procedure of the wireless mobile terminal after the user sets indicator icons. In the following description, certain of the selected icons are displayed in response to a call signal.

Upon receipt of a call signal such as a voice call or a text message, the call processing manager 82 requests the indicator processing manager 84 to perform an operation related to a corresponding indicator icon (S100).

The indicator processing manager 84 checks whether there is an indicator icon set to be activated according to the request signal from the call processing manager 82, and checks whether the indicator icon belongs to essential indicator icons which should be displayed (S102).

When the indicator icon belongs to the essential indicator icons, the operation related to the indicator icon is immediately performed to allow a display manager to display the indicator icon on the terminal's screen.

On the other hand, when the indicator icon belongs to indicator icons selected by the user, it is checked whether the indicator icon is set to be displayed according to the user's selection (S104).

When the indicator icon is set to be not displayed, the indicator processing manager 84 terminates its operation without performing the operation related to the indicator icon.

When the indicator icon is set to be displayed, it is checked whether the current display mode is the fixed screen mode or the sliding screen mode (S106).

When the current display mode is the fixed screen mode, because the number of displayable indicator icons is limited, it is checked whether the indicator icon in question can be displayed after confirming the number of indicator icons currently displayed on the terminal's screen. In some situations the user may not be allowed to set more than the selectable number of icons in the fixed mode. Thus, this check may be unnecessary.

When it is impossible to add the indicator icon on display, the indicator processing manager 84 terminates its operation without performing the operation corresponding to the indicator icon.

When it is possible to add the indicator icon on display, the corresponding indicator icon is displayed on the terminal's indicator display region (S108).

When the current display mode is the sliding screen mode, the corresponding indicator icon is displayed on the terminal's indicator display region. When the number of indicator icons to be displayed exceeds the maximum number of indicator icons which can be displayed through one screen, the screen is scrolled to display the remaining indicator icons on the next screen (S110).

As mentioned above, the present invention allows users to set indicator icons of the terminal's states by themselves.

As apparent from the above description, the present invention provides a method for allowing users to set, according to their preferences, indicator icons to be displayed on a status indicator region of a wireless mobile terminal having a limited size of its display region, whereby users can display indicator information more useful to themselves on the screen. In addition, the user can select indicator icons to be displayed, so that the users can be notified of a larger quantity of indicator information useful to themselves.

Further, the users can display indicators in a sliding screen mode, so that as much information of the wireless mobile terminal can be displayed as they desire, irrespective of the size of the display region.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A method for controlling a display of indicators in a wireless mobile terminal, comprising the steps of:
   determining whether an indicator icon setting menu is selected by a user;
   displaying an indicator setting menu screen including an indicator icon list when the indicator icon setting menu is selected, the indicator icon list including selectable indicator icons and non-selectable indicator icons;
   determining whether at least one indicator icon to be displayed on an indicator region is selected by the user from the selectable indicator icons; and
   displaying the selected indicator icon to change a previously assigned indicator icon according to a display mode of the selected indicator icon on the indicator region, wherein the non-selectable indicator icons are essential indicator icons which should always be displayed on the indicator region.

2. The method as set forth in claim 1, wherein the at least one indicator icon is selected by an ON/OFF manner.

3. The method as set forth in claim 1, further including selecting the display mode of the selected indicator icon, comprising selecting one of a fixed screen mode, in which a predetermined number of indicator icons are displayed, and a sliding screen mode in which indicator icons set to be displayed are all displayed while scrolling.

4. The method as set forth in claim 3, wherein, if the fixed screen mode is selected, the user is informed of a number corresponding to the number of selectable indicator icons, and conversion to the fixed screen mode is prohibited if the number of selected indicator icons is too large to display.

5. A method for operating a display of indicators in a wireless mobile terminal, comprising the steps of:
   displaying an indicator icon setting menu screen including an indicator icon list when the indicator icon setting menu is selected, the indicator icon list including selectable indicator icons and non-selectable indicator icons;
   determining whether at least one indicator icon to be displayed on an indicator region is set by a user from the selectable indicator icons;
   receiving a call signal on wireless mobile terminal;
   determining whether there is an indicator icon set by the user to be activated corresponding to the call signal;
   if the indicator icon is activated, checking a display mode of indicator icons; and
   displaying the indicator icon on an indicator display region of the wireless mobile terminal in accordance with the display mode, wherein the non-selectable indicator icons are essential indicator icons which should always be displayed on the indicator region.

6. The method as set forth in claim 5, wherein said step of determining whether there is an indicator icon set to be activated corresponding to the call signal includes the steps of:
   determining whether the indicator icon belongs to essential indicator icons which must be displayed; and
   determining whether the user has selected activation of the indicator icon corresponding to the call signal.

7. The method as set forth in claim 5, wherein said step of checking a display mode of indicator icons includes checking whether the user has selected a fixed screen mode or a sliding screen mode.

8. The method as set forth in claim 1, further comprising checking, by an indicator processing manager, whether an indicator icon set to be activated is an essential indicator icon.

9. The method as set forth in claim 8, wherein, if it is determined that the indicator icon set to be activated is the essential indicator icon, the indicator processing manager immediately performs an operation related to the essential indicator icon.

* * * * *